United States Patent Office 2,744,029
Patented May 1, 1956

2,744,029

PREPARATION OF WATER DISPERSIBLE TITANIUM DIOXIDE PIGMENT

Franklin L. Kingsbury, New Brunswick, N. J., assignor to National Lead Company, New York, N. Y., a corporation of New Jersey No Drawing. Application May 24, 1952,
Serial No. 289,900

6 Claims. (Cl. 106—300)

The present invention relates in general to titanium dioxide pigment material and more especially to the preparation of an improved water dispersible titanium dioxide pigment material for use in water paints, paper manufacturing, rubber goods and the like where fluid suspensions of high solid content are required.

In general titanium dioxide pigment materials are produced by reacting titaniferous materials such as, for example, titaniferous iron ore, ore concentrates and blends thereof with sulphuric acid to form a sulphate cake which is dissolved in water to form a digestion solution in which the ferric sulphate fraction is reduced to ferrous sulphate by metallic iron. The digestion solution is then clarified and filtered whereupon the filtered solution is crystallized to remove some of the iron fraction, the titanium sulphate solution being then converted into a titanium hydrate by hydrolysis. The hydrate is then thoroughly washed and calcined to develop the desired crystalline structure of the pigment particles. As is generally known titanium dioxide may have an anatase crystalline structure or a rutile crystalline structure depending upon the precalcination treatment of the hydrate. The anatase pigment is a relatively soft pigment and hence is amenable to dry grinding to produce a pigment suitable for use in oil or water base paints, paper, rubber goods and the like. However, while rutile pigment is known to have a considerably higher hiding power than anatase pigment and for this reason is very desirable for use in water base paints, paper manufacture and like purposes, heretofore no process has been discovered for producing a rutile type titanium dioxide pigment material substantially free of coarse particles and having a high degree of dispersion in a water vehicle.

An object of the present invention is therefore to procide an improved process for forming a calcined titanium dioxide pigment material having high degree of dispersion in an aqueous medium.

A further object of the invention is to provide an improved process for producing a rutile pigment material which will readily disperse in a water vehicle without the formation of agglomerates or flocculents.

A still further object of the invention is to provide an improved process for making a water dispersible rutile pigment by forming a pigment material free of any traces of the flocculating agent.

Other objects and advantages will be evident from the following description thereof.

In its broadest aspects the invention contemplates an improved process for forming a water dispersible titanium dioxide pigment by wet milling a calcined titanium dioxide pigment material flocculating the milled slurry in the presence of a volatile organic acid and then heating the flocculent to volatilize and remove any traces of the organic flocculating acid therefrom. Where reference is made hereinafter to the removal of any traces of the organic flocculating agent it shall be understood to mean that the flocculating agent is substantially completely removed from the pigment material any infinitesimal amounts remaining being so small as not to adversely affect the subsequent water dispersibility of the pigment.

Heretofore in the development of water dispersible pigment neutral alkali metal salts such as, for example, $Na_2SO_4$, $NaCl$ and $MgSO_4.7H_2O$ have been used as flocculating agents but invariably small amounts of the flocculating agent have remained in the dried flocculent despite successive washings and have acted to reflocculate the pigment material when used in a water vehicle. Moreover, when used in conjunction with a dispersing agent relatively large amounts of the flocculating agent, e. g. 3% $NaSO_4$ were required to insure a sufficient degree of flocculation while the washed flocculent was thixotropic and hence filtered slowly.

The present invention relates to the discovery that calcined titanium dioxide pigment material which has been wet milled and preferably hydroseparated may be flocculated by using a volatile organic flocculating agent such as, for example, formic acid, or acetic acid to form a flocculent from which, by subsequent heating and drying operations, substantially all traces of the flocculating agent are driven off by volatilization. The resulting pigment material is characterized by an unusually high degree of dispersion in a water vehicle.

A proper understanding of the invention necessitates an explanation of the term "water dispersion" as applied to pigment materials; and the procedure employed for testing the water dispersion characteristics of a pigment material.

The term "water dispersion," as used herein, is synonymous with the degree of dispersion in water of a pigment material and is measured by the absence of coarse gritty aggregates and/or agglomerates in the pigment. One method for measuring the water dispersibility of pigment is the so-called Starch Test which is performed by mixing the pigment with a starch solution using high speed agitation and then drawing down a thin starch film on a glass plate. After drying, the starch film is examined for coarse particles and rated from one to ten. The number rating of a starch film is hereinafter referred to as the Starch Drawdown Number, and is indicative of the number of coarse particles in the sample, the number one being indicative of a pigment material which is substantially free of coarse gritty particles and hence highly dispersible in water. The procedure used in carrying out the Starch Test is as follows:

A 10% starch solution is prepared by adding "Hercules 90" starch to cold water, heating the suspension to 88° C. and then allowing it to cool. 30 grams of the water dispersible pigment is blended with 100 milliliters of the starch solution for 10 minutes in a Hamilton Beach mixer. A film 0.0095 inch thick is drawn down on a glass plate using a Bradley blade and when dry the film is lighted at a grazing angle of 8° and examined with a 20 power glass the number of particles counted in a representative area of 63 square millimeters of the film being indicative of the completeness of dispersion of the pigment material.

The degree of dispersion of the water dispersible rutile pigment produced by the hereinafter described process of this invention is from 1 to 3 which exceeds the dispersibility in water of any titanium dioxide pigments heretofore produced.

A second method for measuring the water dispersibility of a pigment is the so-called Fraser test which is acrried out as follows:

5 grams of sample pigment material are placed in a 100 cc. graduated cylinder which is then filled up to the 100 cc. mark with distilled water. The contents are mixed thoroughly by shaking or with the aid of a stirring rod if necessary. The resulting suspension is then allowed to stand for four hours after which the top 20 cc. is pipetted off. The withdrawn sample is then coagulated by the addition of 10 cc. of saturated ammonium chloride solution, filtered, ignited and the resulting residue weighted.

The Fraser number corresponds to the percent solids which settle out and is expressed by the following equation:

Percent settled = 100 − (weight of residue × 100)

Water dispersible pigment material having a Fraser number of from 1% to 10% are regarded as having excellent water dispersibility characteristics.

A further indication of the water dispersability of a pigment material is the amount of solids which may be suspended in a given amount of water vehicle, a large amount of solids being synonymous with small size particles and a high degree of dispersion. The test for indicating the maximum solids in a given quantity of water is called the pour point test and is carried out as follows:

100 grams of pigment material are ground with water in a one quart jar mill containing 65 ½ balls. The sample is milled for 15 minutes and inspected. If the pour point has not been reached an additional 5 cc. of water is added and milling continued for another 15 minutes. This practice is continued until the pour point has been reached. In any case, the sample is allowed to mill until the total milling time is one hour.

The pour point is measured in terms of the percent solids in the milled sample a pour point of from 70–75% being unusually high and indicative of high water dispersibility.

The present invention relates, in particular, to the discovery that an exceptionally high degree of water dispersion may be secured by employing a volatile organic flocculating agent such as formic acid or acetic acid which are volatile at the temperatures employed for drying the flocculent; and that the amount of organic acid required to flocculate the calcined titanium dioxide pigment material is unexpectedly small the minimum requirement being about 0.12% based on the weight of the calcined titanium dioxide. While the maximum requirement of flocculating agent is not critical about 2% based on the weight of the calcined titanium dioxide is permissible. Further, the flocculent produced by an organic flocculating agent has been found to filter easily and rapidly and to produce a filter cake which may be readily dried and milled to form a titanium dioxide pigment material having a high degree of dispersion in water, and when of rutile crystal structure, characterized by high tinting strength and high hiding power.

While formic acid and acetic acid have been found to provide optimum results with minimum amounts of acid based on the weight of the calcined titanium dioxide other organic acids may be used such as, for example, citric acid and tartaric acid.

The process of the present invention embodies further, in conjunction with a volatile organic flocculating acid, the addition of an organic dispersing agent to the calciner discharge prior to hydroseparation and flocculation so as to form a millable slurry, and the addition of an organic dispersing agent to the dried filter cake prior to or concurrent with the milling and micropulverizing operations.

Heretofore, it has been customary to use inorganic dispersing agents for forming a millable slurry of the calciner discharge but, in general, the inorganic dispersing agents such as, for example, sodium hexametaphosphate, are too strong for use in conjunction with an organic flocculating agent and may even seriously impair the final dispersibility of the pigment material.

However, it has been found that certain amines are highly satisfactory as organic dispersants and these include monoethanolamine, morpholine and triethanolamine. Ethanolamine was found to be highly efficient as a preliminary dispersant, i. e. as a dispersant for forming a millable slurry; while triethanolamine was found to produce superior results as a final dispersant to be left in the milled pigment for insuring dispersibility in a water vehicle. It has been found that excellent water dispersible properties were obtained by using as little as 0.05% ethanolamine, based on the amount of $TiO_2$ present, as the organic dispersing agent for wet milling, and as little as 0.15% triethanolamine as the final dispersal.

While other organic dispersing agents as well as some inorganic dispersing agents may be used as dispersants for wet milling and as final dispersants, in general these dispersants require larger amounts of a flocculating agent based on the amount of titanium dioxide present and hence are less desirable from the economic standpoint.

In a preferred embodiment of the invention calcined titanium dioxide having rutile crystalline structure is slurried with enough water and an organic dispersing agent such as, for example, ethanolamine in an amount of from about 0.05% to 0.2%, based on the amount of $TiO_2$, to fully disperse the calciner discharge which is then milled for a suitable period to reduce the pigment particles to the desired size. The milled slurry is diluted with water to constitute substantially 10% solids which is hydroseparated for a sufficient length of time to separate the larger particles (those above 3 microns) from the fines. A volatile organic flocculating acid such as, for example, formic acid is then added to the decanted fines to flocculate the latter the amount of formic acid comprising from about 0.1% to about 0.5% based on the weight of the titanium dioxide. The flocculated fines are then allowed to settle after which they are filtered and washed with water or a dilute solution of formic acid. The resulting filter cake is dried by heating to a temperature from about 110° C. to 180° C. for a suitable length of time within which temperature range the formic acid is volatilized so that substantially all traces thereof are completely removed from the filter cake. The filter cake is then broken up into lumps and chaser milled and micropulverized, an organic dispersing agent such as, for example, triethanolamine being added to the pigment material in an amount of from about 0.1% to about 0.3% based on the weight of the titanium dioxide pigment and preferably before dry milling, to produce a pigment material having a high degree of dispersion in a water vehicle.

In order that the invention may be more easily understood the following specific examples are given.

*Example 1*

200 parts of titanium dioxide calciner discharge was milled at 60% solids with 0.1% monoethanolamine based on the parts by weight of the titanium dioxide for 5 hours in a quart size ball mill to form a slurry which was diluted to 12% solids and hydroseparated for 2 hours. The decanted fines from the hydroseparated slurry were then flocculated with 0.15% formic acid based on the parts by weight of the titanium dioxide as 10% solution to produce a titanium dioxide flocculent. The latter was then filtered to produce a titanium dioxide filter cake which was washed with 2 parts per liter dilute formic acid and dried at a temperature of from about 110° C. to 130° C. for about 10 hours to completely volatilize and remove any traces of formic acid from the filtered pigment. The dried filter cake was then broken up into small particles and treated with 0.1% triethanolamine based on the parts by weight of titanium dioxide the triethanolamine being added as a 10% alcoholic solution to the filter cake particles. Thereafter the treated filter cake particles were chaser milled for 5 minutes and micropulverized.

The pigment material had a starch drawdown number of 1, Fraser number of 10%, a tinting strength of about 1600 and a pour point of 77%.

Example II

The procedure followed was similar to that of Example I except that 0.65% acetic acid based on the weight of titanium dioxide was used instead of formic acid to flocculate the hydroseparated slurry.

The pigment material had a starch drawdown number of 2, a Fraser number of 12%, a tinting strength of about The pigment material had a starch drawdown number of 2, a Fraser number of 12%, a tinting strength of about 1625 and a pour point of 80%.

Example III

The procedure followed was similar to that of Example I except that 0.05% 2-amino-2-methyl-1-propanol was used as the dispersing agent both in forming the millable slurry and in the treatment of the dried filter cake.

The pigment material had a starch drawdown number of 1, a Fraser number of about 8%, a tinting strength of about 1625 and a pour point of 81%.

Thus by the process of this invention a water dispersible rutile pigment has been formed having the exceptionally high hiding power which characterizes the rutile crystal structure whereby a substantial improvement in the opacity of paper, latex paints, rubber goods and the like has been achieved, the process being characterized by the use of a volatile organic flocculating agent for flocculating the milled slurry of the calciner discharge whereby upon subsequent filtering and drying of the flocculent all traces of the flocculating agent are removed from the pigment material by volatilization thereby insuring complete dispersion of the pigment in a water vehicle.

While this invention has been described and illustrated by the examples shown it is not intended to be limited thereto and other modifications and variations may be employed within the scope of the following claims.

I claim:

1. In a process for making a water dispersible titanium dioxide pigment material in which the pigment material is calcined, wet milled and hydroseparated the steps of: adding formic acid to the hydroseparated pigment material to form a titanium dioxide flocculent; filtering said flocculent to form a titanium dioxide filter cake; heating said filter cake to a temperature of from about 120° C. for a period of time sufficient to dry said filter cake and simultaneously volatilize and remove any traces of said organic flocculating agent therefrom; and then milling said dried filter cake to produce a water dispersible titanium dioxide pigment material.

2. In a process for making a water dispersible titanium dioxide pigment material in which the pigment material is calcined, wet milled and hydroseparated the steps of: adding formic acid to the hydroseparated pigment material in an amount of at least about 0.12% based on the weight of the titanium dioxide to form a titanium dioxide flocculent; filtering said flocculent to form a titanium dioxide filter cake; heating said filter cake to a temperature of about 120° C. to dry said filter cake and simultaneously volatilize and remove any traces of said formic acid therefrom and then milling said dried filter cake to produce a water dispersible titanium dioxide pigment material.

3. A process for making a water dispersible titanium dioxide pigment material from a calcined titanium dioxide hydrate comprising the steps of: mixing said calcined hydrate with water and an organic dispersing agent selected from the group consisting of monoethanolamine and triethanolamine to form a slurry; wet milling said slurry; hydroseparating said wet milled slurry; adding to said hydroseparated slurry a carboxylic acid selected from the group consisting of formic and acetic acids to form a titanium dioxide flocculent, said carboxylic acid being volatile in the temperature range used to dry said flocculent; heating said flocculent to a temperature of from about 110° C. to 180° C. to dry said flocculent and simultaneously volatilize and remove any traces of said carboxylic acid therefrom; and then milling said dried flocculent in the presence of an organic dispersing agent selected from the group consisting of monoethanolamine and triethanolamine to produce a water dispersible titanium dioxide pigment material having a starch dispersion value of from 1 to 2.

4. A process for making a water dispersible titanium dioxide pigment material from a calcined titanium dioxide hydrate comprising the steps of: mixing said calcined hydrate with water and monoethanolamine to form a slurry; wet milling said slurry; hydroseparating said wet milled slurry; adding formic acid to the hydroseparated slurry to form a titanium dioxide flocculent; said formic acid being volatile in the temperature range used to dry said flocculent; heating said flocculent to a temperature of from about 110° C. to 180° C. to dry said flocculent and simultaneously volatilize and remove any traces of said formic acid therefrom; and then milling said dried flocculent in the presence of triethanolamine to produce a water dispersible titanium dioxide pigment material having a starch dispersion value of from 1 to 2.

5. A process for making a water dispersible titanium dioxide pigment material from a calcined titanium dioxide hydrate comprising the steps of: mixing said calcined hydrate with water and ethanolamine in an amount of about 0.05% based on the weight of the titanium dioxide to form a slurry; wet milling said slurry; hydroseparating said wet milled slurry; adding formic acid in an amount of at least about 0.12% based on the weight of the titanium dioxide to the hydroseparated slurry to form a titanium dioxide flocculent; heating said flocculent to a temperature of about 120° C. for a period of time sufficient to dry said flocculent and simultaneously volatilize and remove any traces of said formic acid from said dried flocculent; and then milling said dried flocculent in the presence of triethanolamine in an amount of about 0.15% based on the weight of the titanium dioxide to produce a water dispersible titanium dioxide pigment material having a starch dispersion value of from 1 to 2.

6. In a process for making a water dispersible titanium dioxide pigment material from a calcined titanium dioxide hydrate in which the titanium dioxide pigment material is calcined and wet milled the steps of: flocculating the calcined wet milled pigment material in the presence of a volatile organic flocculating agent comprising a carboxylic acid selected from the group consisting of formic acid, and acetic acid to produce a titanium dioxide flocculent; heating said flocculent to a temperature from about 110° C. to about 180° C. to dry said flocculent and simultaneously volatilize and remove any traces of said organic flocculating agent therefrom; and then milling said dried flocculent to produce a water dispersible titanium dioxide pigment material.

References Cited in the file of this patent

UNITED STATES PATENTS

| | | |
|---|---|---|
| 2,297,523 | Allan et al. | Sept. 29, 1942 |
| 2,365,560 | Kingsbury et al. | Dec. 19, 1944 |

OTHER REFERENCES

"Titanium," Barksdale, The Ronald Press Co., New York, page 266.